Nov. 17, 1936.  H. R. MAZURIE  2,061,366
PROTECTOR FOR PIPE ENDS
Filed Dec. 13, 1935
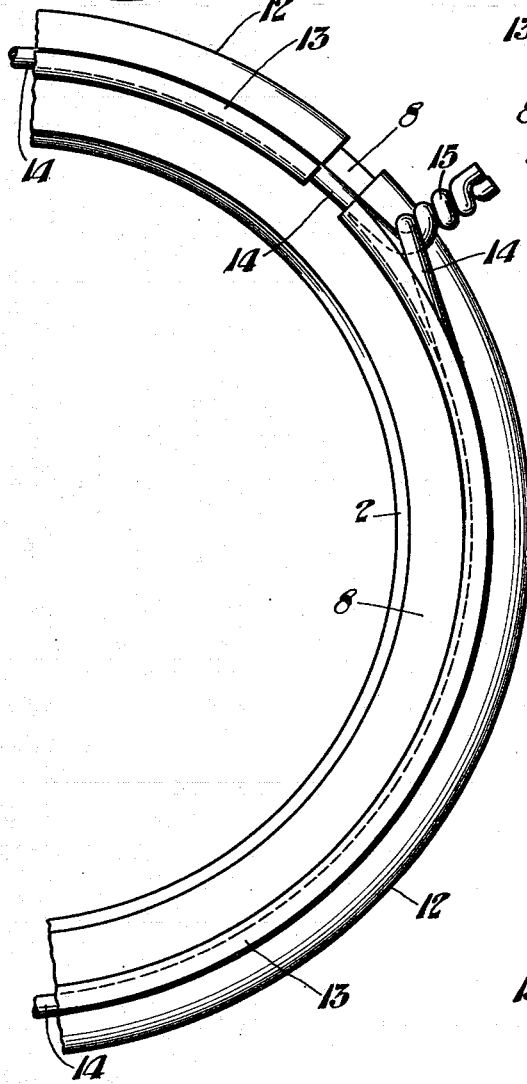
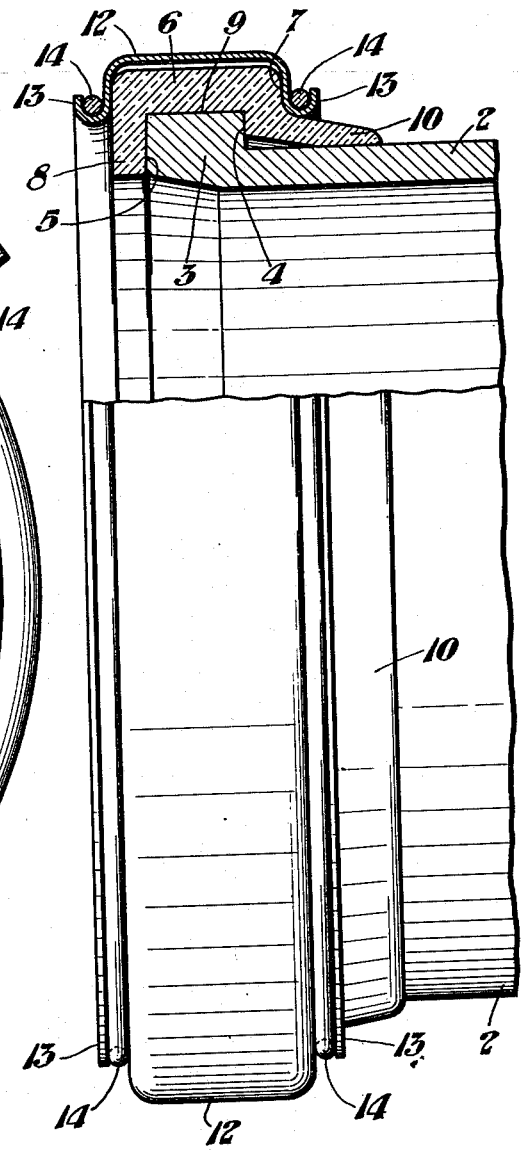
Inventor:
HARRY R. MAZURIE,
by: Usina & Rauber
his Attorneys.

Patented Nov. 17, 1936

2,061,366

UNITED STATES PATENT OFFICE 2,061,366

PROTECTOR FOR PIPE ENDS

Harry R. Mazurie, Pittsburgh, Pa., assignor to National Tube Company, a corporation of New Jersey Application December 13, 1935, Serial No. 54,333

1 Claim. (Cl. 138—96)

This invention relates to improvements in protectors for pipe ends, and more particularly to pipe ends which have been upset and doubled over in order that they may be used for joints of the "Victaulic" type.

It is one of the objects of the invention to provide a protector for pipe ends which is waterproof, very durable in service, and cheap and easy to manufacture.

Another object is the provision of a device of the class described which may be quickly and easily attached to the pipe.

These and other objects will be apparent after referring to the drawing, in which:

Figure 1 is a fragmentary elevation, partly in section, of a pipe end to which the device of the invention has been applied.

Figure 2 is an end view.

Referring more particularly to the drawing, the numeral 2 designates a pipe having an end 3 which has been upset and double over on its end, as at 4 and 5, respectively. Pipe ends of this type are generally for "Victaulic" joints, but may be threaded for the customary screw-coupling.

According to the present invention, a ring 6 of rubber, or other flexible material, is provided with right angularly extending portions 7 and 8 in order to form a central groove, or annular recess, 9. The right angularly extending portion 7 of the flexible ring 6 is provided with an integral, substantially right angular annular extension 10, which is adapted to engage the exterior of the pipe 2 adjacent its end 3.

The ring 6 is disposed over the end 3 of the pipe 2 and compressed by an annular split ring 12 of substantial width. This ring 12 has depending, or inwardly extending, portions at each of its ends which are curved to provide troughs 13. A bale wire 14 is disposed in each of the troughs 9 and twisted as shown at 15, to compress the split ring 9.

While I have shown and described one specific embodiment of my invention, it will be understood that I do not wish to be limited exactly thereto, since various modifications may be made without departing from the scope of my invention, as defined by the following claim.

I claim:

In a protector for a pipe having an external annular flange adjacent one of its ends, a channel-shaped annular elastic ring having a groove which is adapted to embrace said flange, the end walls of said groove providing abutments at the sides of said flange, a channel-shaped annular metallic split ring having a groove which is adapted to embrace said annular elastic ring, said metallic split ring comprising a central substantially cylindrical portion and inwardly extending edge portions having troughs providing seats for tie wires, and tie wires in said troughs adapted to contract said metallic split ring and said annular elastic ring into close engagement with said flange.

HARRY R. MAZURIE.